(12) United States Patent
Adler et al.

(10) Patent No.: US 9,602,237 B2
(45) Date of Patent: Mar. 21, 2017

(54) SIDEBAND PARITY HANDLING

(71) Applicant: Intel Corporation, Santa Clara, CA (US)

(72) Inventors: Robert P. Adler, Santa Clara, CA (US); Geetani R. Edirisooriya, Tempe, AZ (US); Joseph Murray, Scottsdale, AZ (US); Deep K. Buch, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 14/578,313

(22) Filed: Dec. 19, 2014

(65) Prior Publication Data

US 2016/0182186 A1 Jun. 23, 2016

(51) Int. Cl.
*G06F 11/10* (2006.01)
*H03M 13/00* (2006.01)
*H04L 1/00* (2006.01)
*H04L 12/40* (2006.01)

(52) U.S. Cl.
CPC .......... *H04L 1/0045* (2013.01); *H04L 1/0063* (2013.01); *H04L 12/40* (2013.01); *H04L 12/40045* (2013.01); *H04L 2001/0094* (2013.01)

(58) Field of Classification Search
CPC ..... H04L 1/0061; H04L 1/0063; H04L 45/00; H04L 69/16; H04L 1/0045; H04L 1/0041; H04L 12/40
See application file for complete search history.

(56) References Cited

U.S. PATENT DOCUMENTS

| | | | |
|---|---|---|---|
| 6,810,501 B1 * | 10/2004 | Ferguson | H03M 13/091 714/757 |
| 8,644,136 B2 | 2/2014 | Chencinski et al. | |
| 8,656,254 B2 | 2/2014 | Wang et al. | |
| 8,761,166 B2 * | 6/2014 | Scott | 370/389 |
| 8,811,430 B2 | 8/2014 | Wagh et al. | |
| 8,874,976 B2 | 10/2014 | Lakshmanamurthy et al. | |
| 2005/0080920 A1 | 4/2005 | Bender et al. | |
| 2013/0111258 A1 * | 5/2013 | Chencinski | H04L 29/14 714/4.1 |

OTHER PUBLICATIONS

International Search Report and Written Opinion in International Application No. PCT/US2015/062029 mailed Feb. 29, 2016.

* cited by examiner

*Primary Examiner* — Shelly A Chase
(74) *Attorney, Agent, or Firm* — Patent Capital Group

(57) ABSTRACT

An inbound sideband interface is provided to receive a message over a first sideband link, and parity logic is provided to calculate a parity bit for the message. Further, an outbound sideband interface is provided to forward the message to another device over a second sideband link. The second sideband link includes a plurality of data wires and a parity bit wire. The message is forwarded over at least some of the data wires and the parity bit is sent to the other device over the parity bit wire to correspond with the message.

21 Claims, 12 Drawing Sheets

SIDEBAND PARITY HANDLING

FIELD

This disclosure pertains to computing system, and in particular (but not exclusively) to error handling.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand increases for future processors to consume at even higher-rates corresponding demand is placed on the capabilities of existing interconnect architectures.

BRIEF DESCRIPTION OF THE DRAWINGS

Like reference numbers and designations in the various drawings indicate like elements.

DETAILED DESCRIPTION

Figure 1:
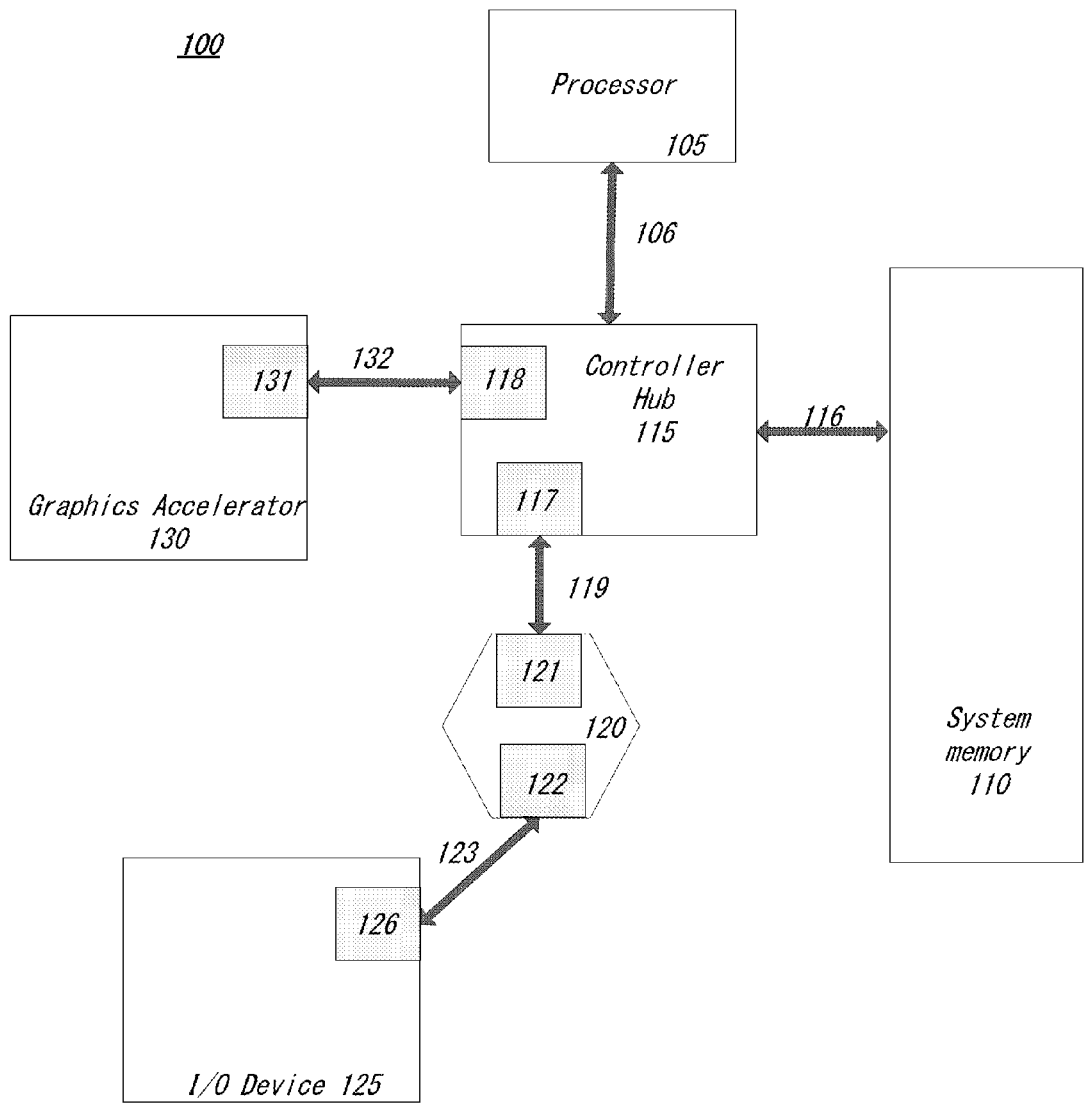
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115, such as a root hub or root complex, through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
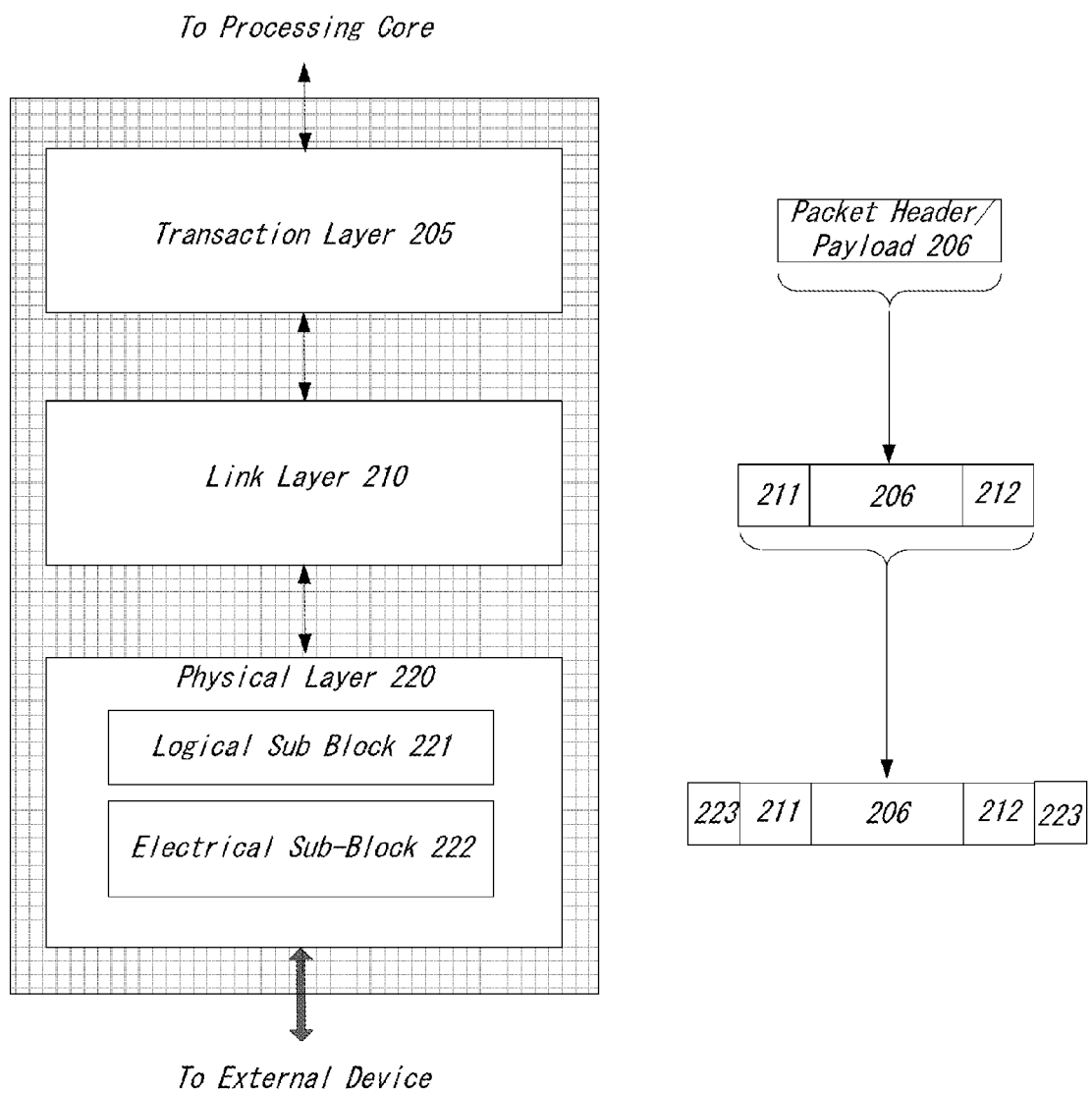
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. An example header packet format is illustrated, for instance, in FIG. 8. Other example packet headers/payloads can be formatted based on various protocol specifications, such as the header/payload formats found in the PCIe specification at the PCIe specification website.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 3:
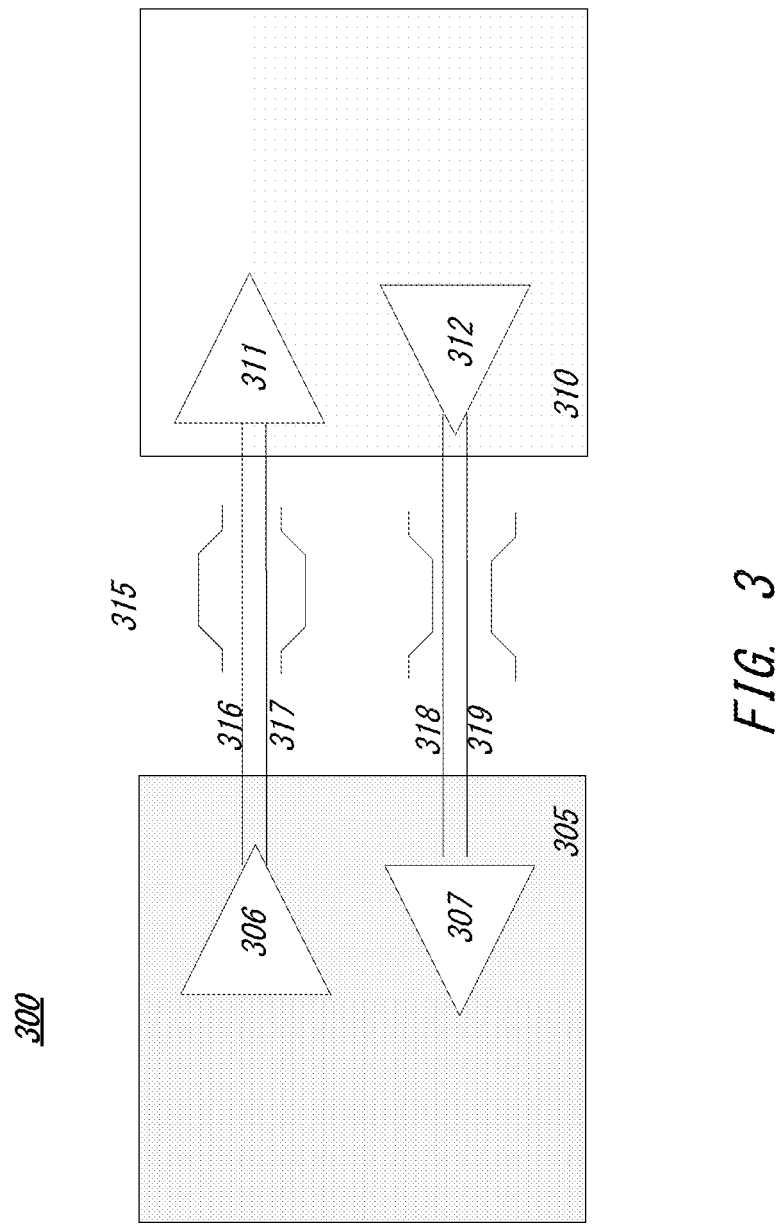
FIG. 3 illustrates an embodiment of a transmitter and receiver pair for an interconnect architecture.

Referring next to FIG. 3, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 306/311 and a receive pair 312/307. Accordingly, device 305 includes transmission logic 306 to transmit data to device 310 and receiving logic 307 to receive data from device 310. In other words, two transmitting paths, i.e. paths 316 and 317, and two receiving paths, i.e. paths 318 and 319, are included in a PCIe link.

A transmission path refers to any path for transmitting data, such as a transmission line, a copper line, an optical line, a wireless communication channel, an infrared communication link, or other communication path. A connection between two devices, such as device 305 and device 310, is referred to as a link, such as link 315. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 316 and 317, to transmit differential signals. As an example, when line 316 toggles from a low voltage level to a high voltage level, i.e. a rising edge, line 317 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 4:
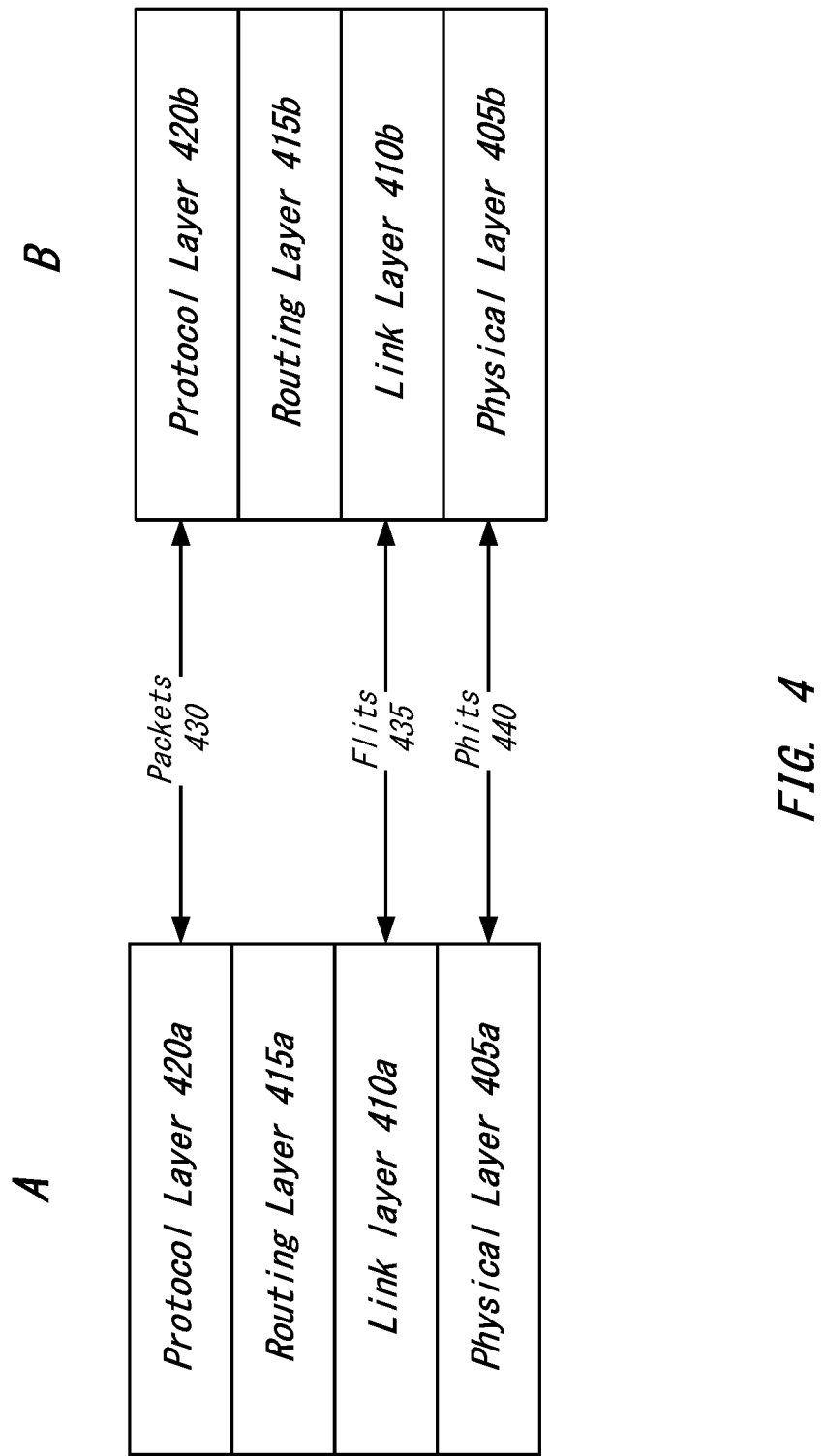
FIG. 4 illustrates another embodiment of a layered protocol.

In some instances, an interconnect architecture or technologies associated with one or more of the protocols supported by a device can include a definition of a layered protocol architecture, including in some examples, protocol layers (coherent, non-coherent, and, optionally, other memory based protocols), a routing layer, a link layer, and a physical layer. Furthermore, HPI can further include enhancements related to power managers (such as power control units (PCUs)), design for test and debug (DFT), fault handling, registers, security, among other examples. FIG. 4 illustrates an embodiment of one example of a layered protocol stack. In some implementations, at least some of the layers illustrated in FIG. 4 may be optional. Each layer deals with its own level of granularity or quantum of information (the protocol layer 405a,b with packets 430, link layer 410a,b with flits 435, and physical layer 405a,b with phits 440). Note that a packet, in some embodiments, may include partial flits, a single flit, or multiple flits based on the implementation.

As a first example, a width of a phit 440 includes a 1 to 1 mapping of link width to bits (e.g. 20 bit link width includes a phit of 20 bits, etc.). Flits may have a greater size, such as 184, 192, or 200 bits. Note that if phit 440 is 20 bits wide and the size of flit 435 is 184 bits then it takes a fractional number of phits 440 to transmit one flit 435 (e.g. 9.2 phits at 20 bits to transmit an 184 bit flit 435 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 410a,b is capable of embedding multiple pieces of different transactions in a single flit, and one or multiple headers (e.g. 1, 2, 3, 4) may be embedded within the flit Physical layer 405a,b, in one embodiment, can be responsible for the fast transfer of information on the physical medium (electrical or optical etc.). The physical link can be point-to-point between two Link layer entities, such as layer 405a and 405b. The Link layer 410a,b can abstract the Physical layer 405a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 420a,b relies on the Link layer 410a,b to map protocol messages into the appropriate message classes and virtual channels before handing them to the Physical layer 405a,b for transfer across the physical links. Link layer 410a,b may support multiple messages, such as a request, snoop, response, writeback, non-coherent data, among other examples.

A Physical layer 405a,b (or PHY) can be implemented above the electrical layer (i.e. electrical conductors connecting two components) and below the link layer 410a,b, as illustrated in FIG. 4. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 405a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 410a,b can be implemented so as to provide reliable data transfer between two protocol or routing entities. The Link layer can abstract Physical layer 405a,b from the Protocol layer 420a,b, and can be responsible for the flow control between two protocol agents (A, B), and provide virtual channel services to the Protocol layer (Message Classes) and Routing layer (Virtual Networks). The interface between the Protocol layer 420a,b and the Link Layer 410a,b can typically be at the packet level. In one embodiment, the smallest transfer unit at the Link Layer is referred to as a flit which a specified number of bits, such as 192 bits or some other denomination. The Link Layer 410a,b relies on the Physical layer 405a,b to frame the Physical layer's 405a,b unit of transfer (phit) into the Link Layer's 410a,b unit of transfer (flit). In addition, the Link Layer 410a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 415a,b can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a packet into the fabric. The lookup at an intermediate router may be used to route a packet from an input port to an output port. The lookup at a destination port may be used to target the destination protocol agent. Note that the Routing layer, in some implementations, can be thin since the routing tables, and, hence the routing algorithms, may not be specifically defined by specification. This can allow for flexibility and a variety of usage models, including flexible platform architectural topologies to be defined by the system implementation. The Routing layer 415a,b relies on the Link layer 410a,b for providing the use of up to three (or more) virtual networks (VNs)—in one example, two deadlock-free VNs, VN0 and VN1 with several message classes defined in each virtual network.

In one embodiment, a Protocol layer 420a,b can be provided to manage the communication of transactions involving packets and packetized data streams. Protocol layer 420a,b, in some implementations, can support agents caching lines of data from memory. An agent wishing to cache memory data may use the protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request, among other examples and features.

In one example, an on-chip system fabric can be provided to serve as a common intellectual property (IP) block interface architecture and enable IP reuse. Interface signals and architecture can be defined for the fabric to provide interface instantiation, arbitration, flow control address decode capability, error handling, power management functions, and other capabilities such that IP blocks designed to be compliant to with the on-chip system fabric can be reused with minimal incremental effort across a wide range of products and use cases.

A system on chip (SoC) architecture can include devices, such as routers, to implement the fabric. Endpoint devices, or agents, can also be provided that are compliant with an interface protocol of the on-chip system fabric. Such agents can connect to the on-chip system fabric and thereby communicate with other agents connected to the fabric. The fabric topology itself can be product specific. However, the on-chip system fabric can define an interface protocol between the agent and the fabric. Agents, and the interface protocol, can be reused across various implementations of systems that utilize the on-chip system fabric architecture.

Figure 5:
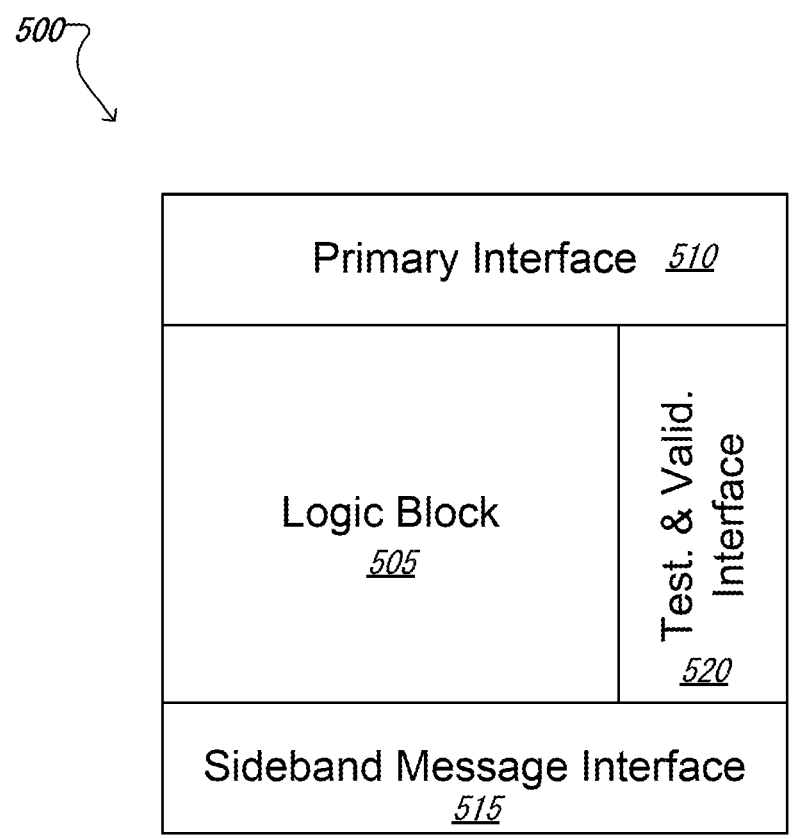
FIG. 5 illustrates an embodiment of an on-chip system fabric agent.

Turning to FIG. 5, a simplified block diagram is shown of an example agent device. An example on-chip system fabric architecture can define three independent interfaces for each agent device. For instance, an agent 500 can include a logic block to define functionality of the device 500. The agent 500 can further include an arbitrary number (even zero) of primary interfaces (e.g., 505) and an arbitrary number (even zero) of sideband interfaces (e.g., 510). A validation and testing interface (e.g., 515) can be optionally included in at least some designs. A primary interface can serve as the high performance interface for command and data transfers between devices. This interface can include a master interface that initiates transactions and a target interface that receives transactions and related data. An agent can support both master and target interfaces. The primary interface can also support the concept of distinct channels to provide independent data flows in an on-chip system. Each independent channel can be a channel of the on-chip system fabric. The on-chip system fabric can define the signaling and protocol to transfer requests of different types from the various ports and/or virtual channels supported by an IP block (e.g., agent) from the master (source) to the target (destination) over the on-ship system fabric.

Sideband interfaces (e.g., 510) can serve as the standard interface for communicating all out-of-band information, including errors, interrupts, power management, etc. within the fabric. The sideband message interface can serve to replace (and eliminate) special purpose wires that can jeopardize reuse of IP blocks (e.g., that possess such dedicated wires). A sideband message interface 510 can standardize out-of-band communications. A standard bus definition and message encoding scheme can be defined to promote modularity and reduce the validation requirement for IP block reuse across various designs.

Figure 6:
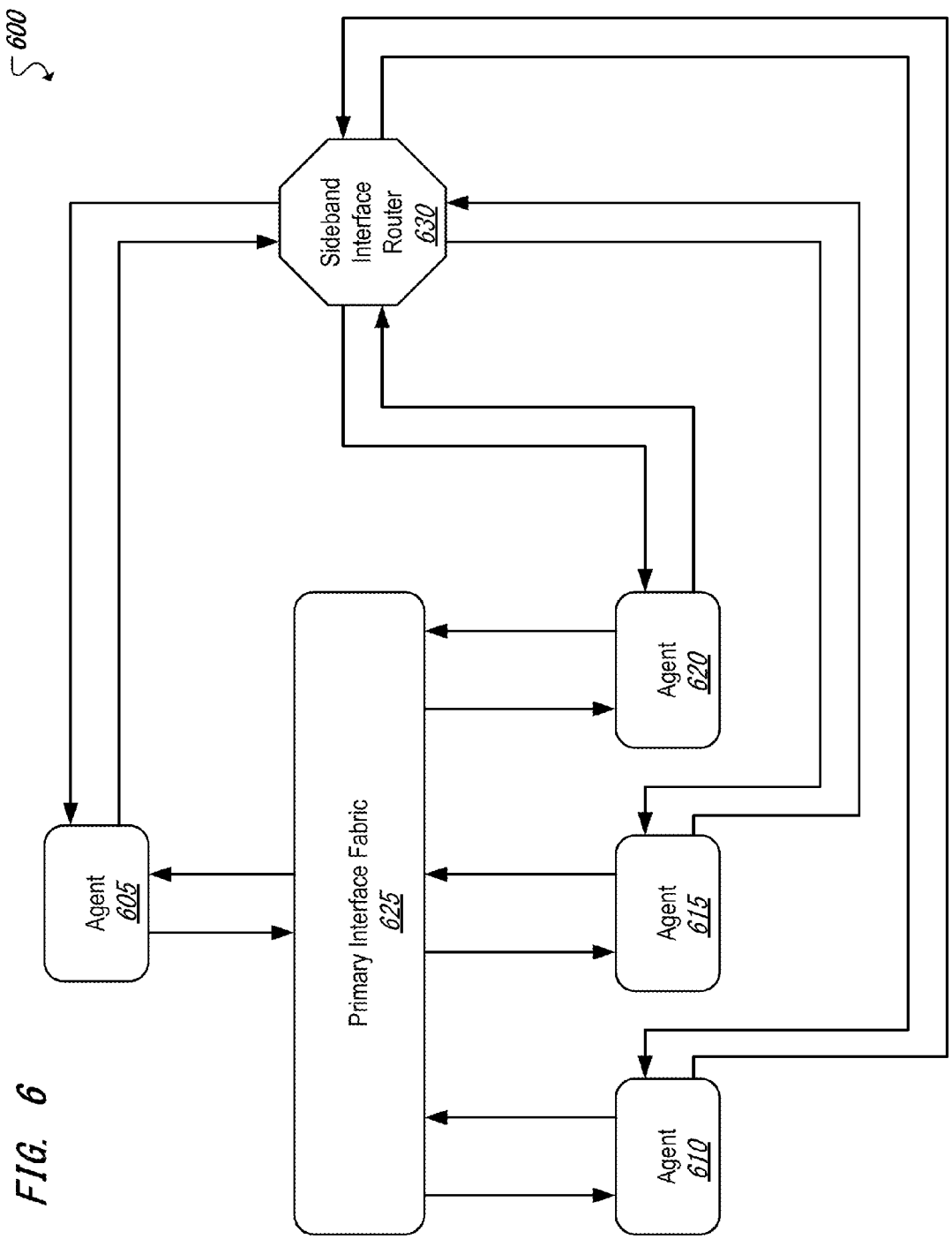
FIG. 6 is a simplified block diagram of an on-chip system fabric including a primary interface fabric and a sideband interface fabric.
Figure 7A:
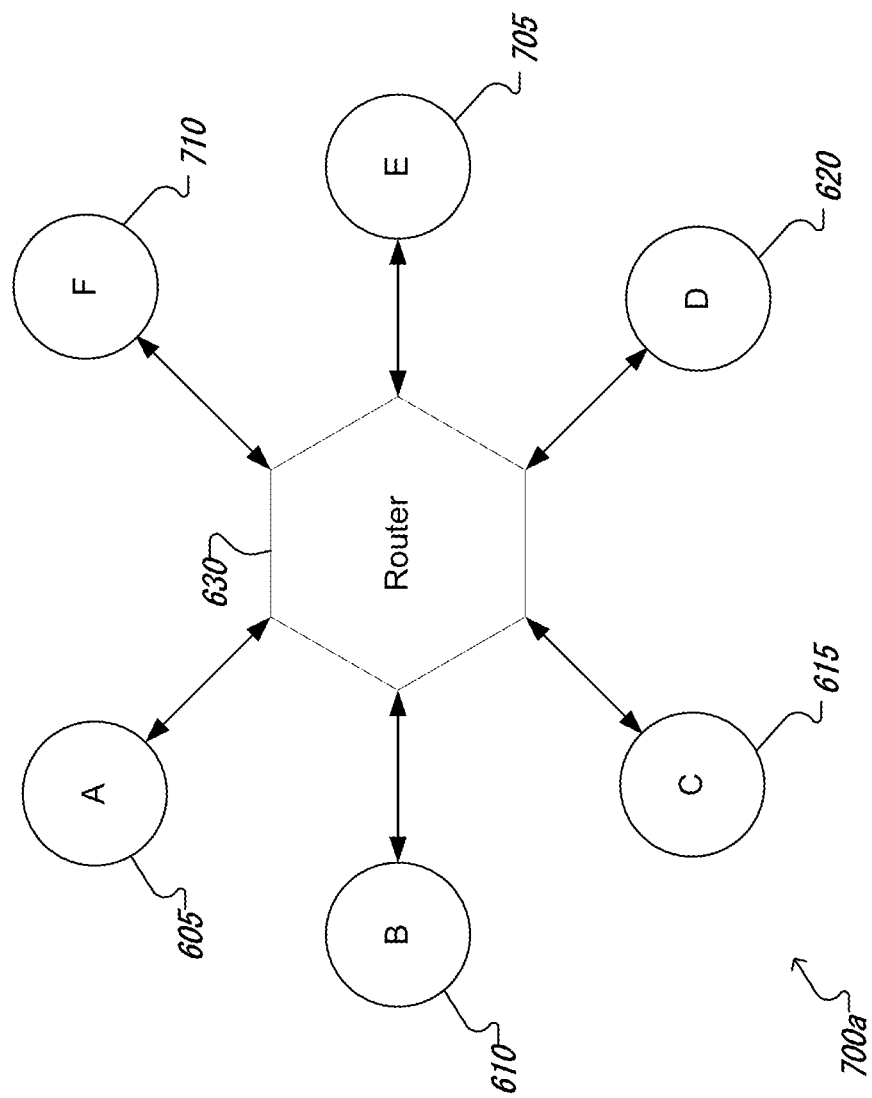
FIGS. 7A-7B are block diagrams representing a plurality of agents connected to one or more fabric elements in accordance with at least some embodiment.
Figure 7B:
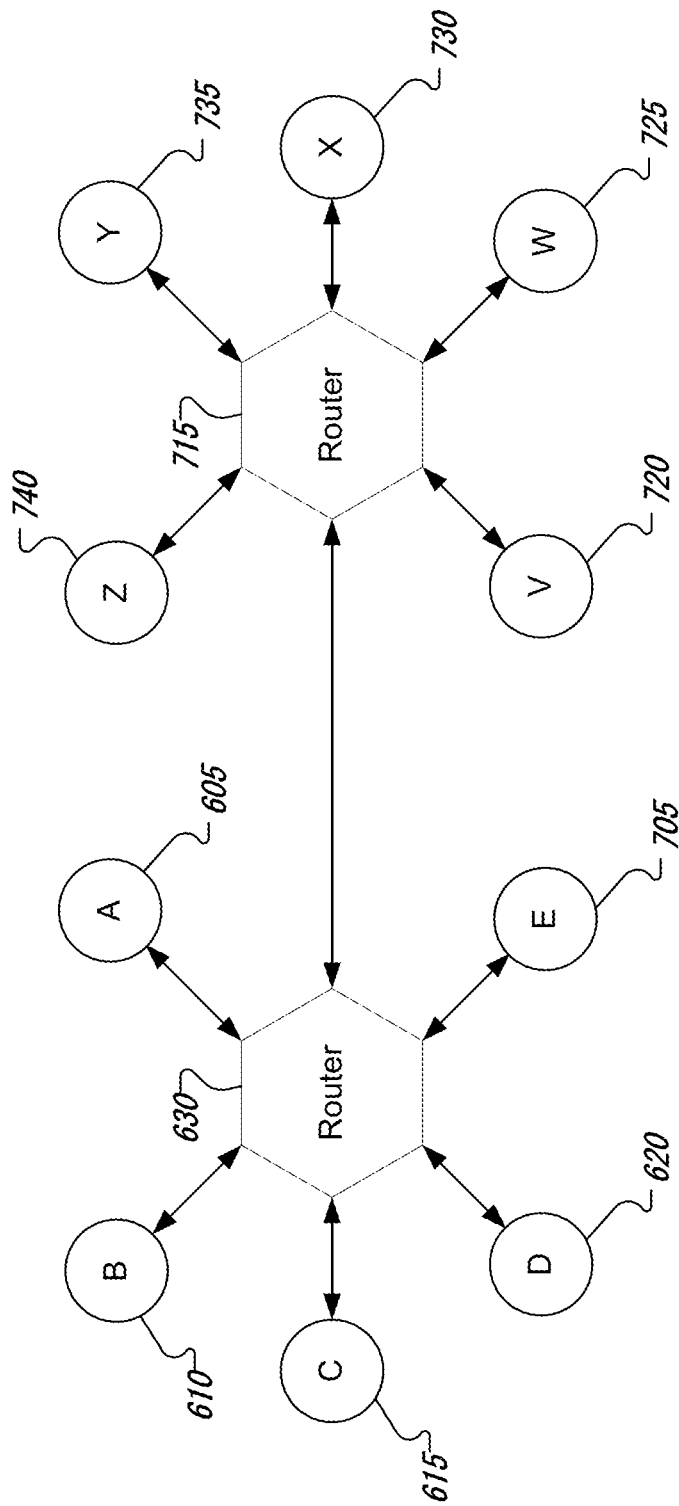

A sideband message interface (e.g., 510) can be a point-to-point network with endpoints, routers, and a network to interconnect the routers. In some implementations, an endpoint agent device supporting a sideband interface can always be connected to an on-chip system fabric sideband router. Turning to FIG. 6, a simplified block diagram 600 is shown illustrating an example fabric, including multiple agents 605, 610, 615, 620 interconnected through a fabric that include a primary interface fabric 625 (that may include one more fabric devices) and a sideband fabric that includes one or more sideband messaging interface routers (e.g., 630). Agents (e.g., 605, 610, 615, 620) can utilize their primary interfaces and the primary interface fabric 625 to communicate in-band communications. For instance, in-band communications can be include transactions between an agent and a host CPU, peer transactions between agents, among other example. All transaction types including memory, I/O, configuration, and in-band messages may be delivered over the primary interface. Sideband (or out-of-band) messages, on the other hand, can be communicated using the sideband fabric (e.g., 630). and an agent FIG. 7A, a simplified block diagram 700a is shown illustrating a portion of a simplified system that includes one or more agents 605, 610, 615, 620, 705, 710 interconnected using a sideband interface router 630, where each agent (e.g., 605, 610, 615, 620, 705, 710) is connected to the router 630 through a respective sideband message interface. Multiple routers (e.g., 635, 715) can be included in other systems, such as the portion of a simplified system illustrated in FIG. 7B (including additional agents 720, 725, 730, 735, 740).

In some architectures, an endpoint can be considered as residing within an agent, whereas routers reside in a fabric. An endpoint on the sideband message interface can be a physical component used by an agent to initiate or receive messages over the sideband message interface. This endpoint can be associated with at least one Port ID. Endpoints can communicate with each other by sending messages that travel over point-to-point interface links through routers in the fabric. Agents are logic devices that have one or more on-chip system fabric interfaces that attach to the fabric.

A link can be made up of two message channels, each of which provides unidirectional communication between two sideband message interface components. Each endpoint can communicate with a single router, providing target information through the use of a destination Port ID within the message. Routers can then forward messages through their ports to other endpoints in the message fabric according to the target specified in the message's Port ID and an internal port-to-port mapping table compiled in each router. A node on a router can be the destination for any number of ports. An example of this would be if one node on a router was a link to another router, such as in the example of FIG. 7B. Indeed, multiple routers may be cascaded in the system to handle more complex topologies. This can assist in minimizing routing from one area of the chip to another by using local routers in each area connected by a single link.

In one embodiment, the sideband message interface topology can adopt a tree structure, where all endpoints are leaf nodes. A single path can defined from any one given port to another. In addition, the fabric topology can take into account power wells that may be powered down. Sideband message interface endpoints in a network can be in different clock domains. The routers in the fabric can implement appropriate structures to handle the crossover from one domain to another.

A sideband message interface can be implemented as a small set of signals between an endpoint and a router. In one example implementation, the sideband interface can be composed of two communication channels. Each communications channel of a sideband interface can be implemented through a number of data communication signals going in one direction (master to target) and two credit update signals that go in the other direction (target to master). The width of the interface can be fixed or can vary between multiple available widths. For instance, a sideband message interface can define any one of an 8-, 16-, or 32-bit serial interface for compliant agents. The sending agent can encode the message packet in to a series of 8-, 16-, or 32-bit flits (flow control units), and the receiver agent can decode these flits to decipher the message. The fabric, on the other hand, may remain ignorant to the message contents (outside of explicit routing field values). For instance, the fabric may be specifically ignorant of the destination Port ID.

Figure 8A:
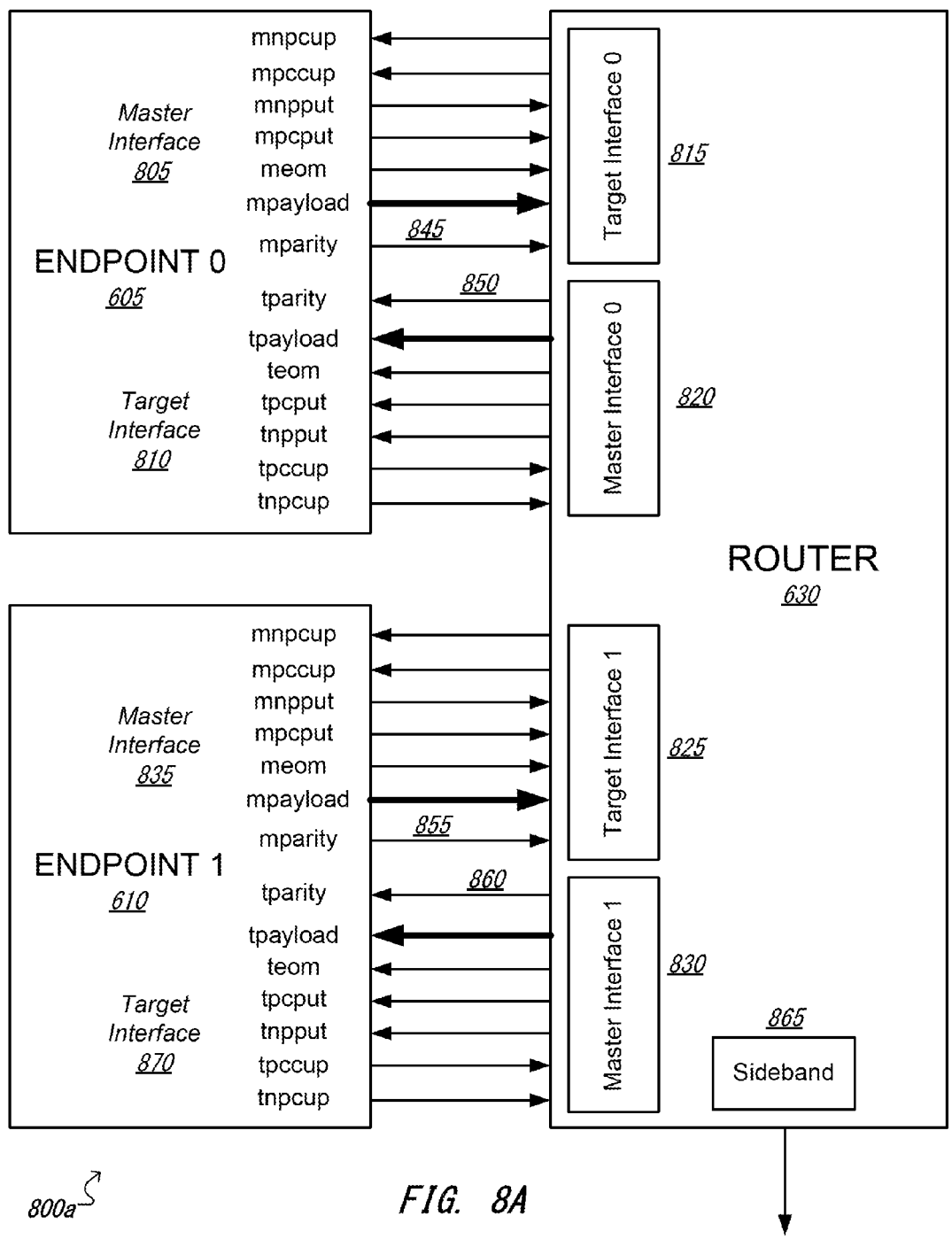
FIGS. 8A-8B are block diagrams illustrating example sideband interfaces in an example implementation of an on-chip system fabric.
Figure 8B:
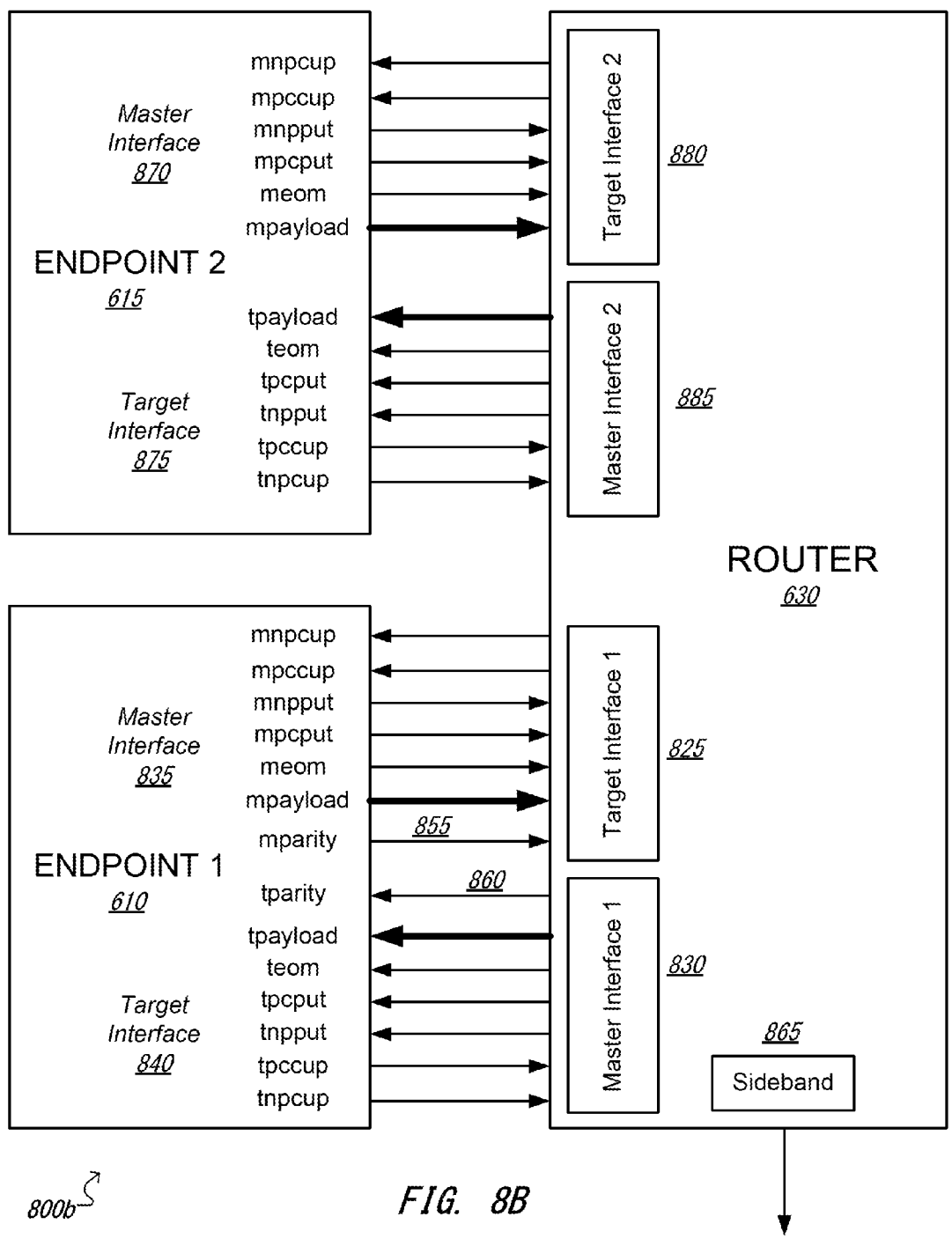

Turning to the examples of FIGS. 8A and 8B, a link can involve the connection of a master interface (e.g., 805) of one device (e.g., 605) with a target interface (e.g., 815) of another (e.g., 630). In one example, signal names can be defined at the endpoint. As a router will typically connect multiple endpoints, the signal names used in the router will be unique and can likely contain information about the master and target interfaces connected. Transactions across the sideband message interface can occur according to a sideband clock rate. Should routers connect endpoints with different payload data widths, multiplexing and demultiplexing occur at such width crossings within the router. Similarly, any clock or power well synchronization can occur in the fabric.

As shown in FIG. 8A, a sideband message interface (e.g., 805) can include a payload channel (e.g., a master payload, "mpayload") and additional control signals. For instance, Tables 1 and 2 describe example sideband message interface signals:

TABLE 1

Master side signal description

| Signal | Width | /O | /O | Description |
|---|---|---|---|---|
| mnpput | 1 | | | Non-posted Put from master to target |
| mpcput | 1 | | | Posted or Completion Put from master to target |
| mnpcup | 1 | | | Non-posted Credit Update from target to master |
| mpccup | 1 | | | Posted or Completion Credit Update from target to master |
| meom | 1 | | | End of Message from master to target |
| mpayload | 8/16/32 | | | Message Payload from master to target |
| mparity | 1 | | | Message parity from master to target |

TABLE 2

Target side signal description

| Signal | Width | /O | /O | Description |
|---|---|---|---|---|
| tnpput | 1 | | | Non-posted Put from target to master |
| tpcput | 1 | | | Posted or Completion Put from master to target |
| tnpcup | 1 | | | Non-posted Credit Update from master to target |
| tpccup | 1 | | | Posted or Completion Credit Update from master to target |
| teom | 1 | | | End of Message from target to master |
| tpayload | 8/16/32 | | | Message Payload from target to master |
| tparity | 1 | | | Message parity from target to master |

A sideband messaging channel can be used to send various interrupt and error messages. Such error messages can notify the system of a parity error detected by a component of the system on a primary interface. In some implementations, the sideband messaging channel can, itself, be equipped with error detection functionality allowing errors on the sideband messaging channel to be detected and reported. For instance, parity handling can be supported for the sideband interface by at least some of the agents. To preserve backward compatibility with endpoints that do not possess sideband parity error handling, sideband routers can be instrumented to provide parity handling on behalf of agents that do not possess such functionality to effectively provide parity handling across the sideband fabric.

In the example of FIG. 8A both Endpoint 0 (605) and Endpoint 1 (610) include parity handling support and are outfitted with additional wires to send and receive parity signals (e.g., 845, 850, 855, 860), target parity ("tparity") and master parity ("mparity"). The router 630 (or other fabric element) connected to a sideband messaging interface of the element can also support the parity signals. Turning to FIG. 8B, some of the endpoints in a system (e.g., Endpoint 2 (615)) may not natively support parity checking and handling. Accordingly, the master and target interfaces (e.g., 870, 875) of such endpoints may lack the additional wire configured for providing an additional parity signal (or bit) that would be used to report parity of sideband messages received and/or sent by the agent. Further, a router (e.g., 630) that is to interface with the endpoint can be configured to omit the optional parity wires in the interfaces (e.g., 880, 885).

Agents can be configured to support parity handling for messages on a sideband messaging interface. Agents can include parity calculation logic to determine a parity value for a message, or portion of a message to be sent over payload lanes of the sideband messaging interface. For instance, parity can be calculated for each flit of data sent over the payload. In some implementations, an end of message ("eom") signal (bit) can also be sent that corresponds to a message flit, and the parity calculation can also consider the eom bit as well as the payload bits of the sideband message. In such an example, an agent can calculate parity such that the number of ones across the payload, eom, and parity interface signals is an even number. Other algorithms can be employed and other interface signals can be considered in calculating the corresponding parity value for a flit of data.

In some systems, only some of the agents may support parity calculation. In such implementations, straps can be defined for an agent. Straps can be constants which are used to statically configure the agent. Straps can be loaded to configure the primary or sideband interfaces of the agent. In the case of the sideband interface, the strap can be loaded in a sideband register or provided as a constant at compile time, among other examples. Further, a special strap can be defined for agents that support parity. For instance, such agents can implement a sideband parity required (SB_PARITY_REQUIRED) strap. This can be used to effectively turn parity handling "on" or "off", for instance, by setting the SB_PARITY_REQUIRED strap. For instance, if the SB_PARITY_REQUIRED strap is not set, the agent is not required to correctly generate parity as a master and can then treat all flits received as a target as having correct parity.

An agent supporting parity handling can detect parity errors as a target (e.g., when SB_PARITY_REQUIRED is set). In such instance, the agent can immediately stop processing the current message in response to detecting the parity error and will not process any flits of any subsequent message. Further, the agent can also stop returning credits if the message is Non-Posted. However, if the message is Posted or Completion, the agent may ignore all flits from the current message and from all subsequent messages, while continuing to return posted/completion (PC) credits to facilitate propagation of any Posted error detection sideband messages. Additionally, an agent that supports parity as a target can provide an internal register to store detection of the parity error and the agent can be configured to remain in an active link state following the detection. Recovery from a parity error detected on the sideband interface by an agent can be limited, in some examples, to resetting the entire sideband network, among other potential remedies.

In some implementations, an agent that detects a parity error as a target on its sideband interface (e.g., when SB_PARITY_REQUIRED is set) can signal the parity error using a sideband message (e.g., sent on its sideband master interface). The error message can indicate that the error is to be handled as a fatal error. For instance, even in cases where the agent has sent an error message, the agent can send another error message with fatal status when it detects a parity error as the target. Accordingly, an agent that supports parity as a target can refrain from processing any message that has a parity error in any of its flits (e.g., when SB_PARITY_REQUIRED is set). In one implementation, a store and forward implementation can be provided where the full message is buffered and checked (e.g., for parity errors) before it is processed (e.g., to contain the error from propagating).

In some implementations, an agent that supports parity may only be responsible for checking parity as a target. For instance, on the agent's master interface, the agent can refrain from conducting a parity check on its own internally generated transactions and instead rely on sideband fabric elements (e.g., a router 630) to detect a parity error in said transactions. In cases where an agent does check parity on its own internally generated transactions (e.g., as the master of a transmission), it can keep its parity check internal and refrain from sending a sideband error message in response (again, relying on the fabric to detect the error and implement notification of the error) that indicates the detection of an error.

As indicated above, fabric elements (e.g., router 630) can also be configured to support parity error handling, detection, and reporting. For instance, a fabric element that is connected to an agent that supports parity can be provided with functionality and corresponding logic for forwarding parity to any possible egress port in the system. Accordingly, fabric elements that support parity may generate correct parity on any message that they internally generate. Further, a fabric element can also generate parity on behalf of any agent it is connected to that is not able to generate parity itself. For instance, in the example of FIG. 8B, a sideband message can be sent from the master interface 870 of endpoint 615. Because endpoint 615 does not support parity, it has not calculated parity for the message and no parity value is provided with the message at the ingress (target) interface 880 of the router 630. The router 630, however, can calculate correct parity on the message prior to placing the message in a queue of the router 630. The router 630 can then check the message for parity errors (using the parity value previously generated by the router) after popping the message from the queue and preparing the message for forwarding on a master interface (e.g., 830) of the router 630. Indeed, the fabric can check parity at the output of all fabric queues. Additionally, fabric elements facilitating width crossings in the network can be directed to perform a parity check anywhere a width crossing occurs.

Upon detection of a parity error, a fabric element (e.g., 630) can immediately stop processing the current message, refrain from processing any flits of any subsequent message, and can stop returning all credits. In some implementations, fabric elements can guarantee that flits with parity errors are contained within the fabric and never propagated. In addition, fabrics that support parity can provide storage for the detection of the parity error. Such storage can be exposed for debug to facilitate analysis of the parity error. Recovery from a stop condition responsive to a parity error detected by a fabric element may only be recovered by resetting the entire sideband network. Parity error storage can also be configured to be reset based on sideband reset.

As with agents, fabric elements are to report parity errors. As the fabric is to guarantee parity error containment, rather than reporting the parity via the sideband messaging interface, the fabric element can be provided with a separate sideband wire 865 for signaling the detection of a parity error detected in a sideband interface message. A fabric that detects a parity error may report the detection of the parity error via a sideband wire 865, as the sideband network should be hung due to the parity error. In support of this feature, individual routers in the fabric may provide a set of inputs to allow the detection of parity errors to be daisychained to other routers in the fabric, among other example implementations.

By way of illustration, an agent (e.g., 605) can receive a sideband message on its target sideband fabric interface from another device (e.g., another agent, a CPU, etc.). The sideband message may be used to communicate a message detected on a primary interface of the fabric (including, in some cases, a parity error detected in a primary interface message). The sideband message may be larger than the width of the payload channel of the target interface. Accordingly, multiple flits may be used to transmit the message. Each flit of the sideband message can include a respective parity bit to indicate the calculated parity for the flit. The parity bit may be calculated by a first router in the fabric that received the flits of the sideband message from the generator of the message. Alternatively, such as in the case of a width crossing, another router in the fabric may have generated the received parity value of the flits received at the target interface of the agent. The agent, upon receiving each flit of the sideband message, can re-calculate parity for each flit and compare each re-calculated value against the corresponding, received parity value. If the parity value of any of the flits is a mismatch, the agent can determine that a parity error exists in the sideband message and immediately cease processing of the message. Indeed, to achieve this safeguard, processing of the message can be delayed until all of the flits of the message have been received and cleared of any parity issues. Further, in the event of a detected parity error, the agent can generate a fatal system error message and send the fatal system error message on its master sideband interface for delivery to other system elements to effect a reset of the system (e.g., an error containment unit and/or reset controller). Reset can involve attempting to gracefully shutdown the fabric such that any outstanding error or interrupt messages first make forward progress. Other traffic may be dropped during the graceful shutdown.

In another example, a fabric element, such as a router 630, can detect a parity error in a sideband message, for instance, when receiving flits of the sideband message at its target interface (e.g., as received from an agent supporting parity) or when flits exit a queue of the router and are re-checked for parity. Rather than sending a message over the sideband interface of the fabric, a router can respond to a detected parity error by guaranteeing containment of the message that is the source of the parity error at the router (e.g., by ceasing to process additional messages until a reset) and sending a parity error signal on a sideband wire independent of the sideband (or primary) fabric interfaces to cause the fabric to enter a reset mode.

It should be noted that the example principles, solutions, and features described herein can be equally applicable to other protocols and systems. Further, note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

The principles and features described herein can be incorporated in any variety of computing devices and systems. For instance, referring to FIG. 9, an embodiment of a block diagram for a computing system including a multicore processor is depicted. Processor 900 includes any processor or processing device, such as a microprocessor, an embedded processor, a digital signal processor (DSP), a network processor, a handheld processor, an application processor, a co-processor, a system on a chip (SOC), or other device to execute code. Processor 900, in one embodiment, includes at least two cores—core 901 and 902, which may include asymmetric cores or symmetric cores (the illustrated embodiment). However, processor 900 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Figure 9:
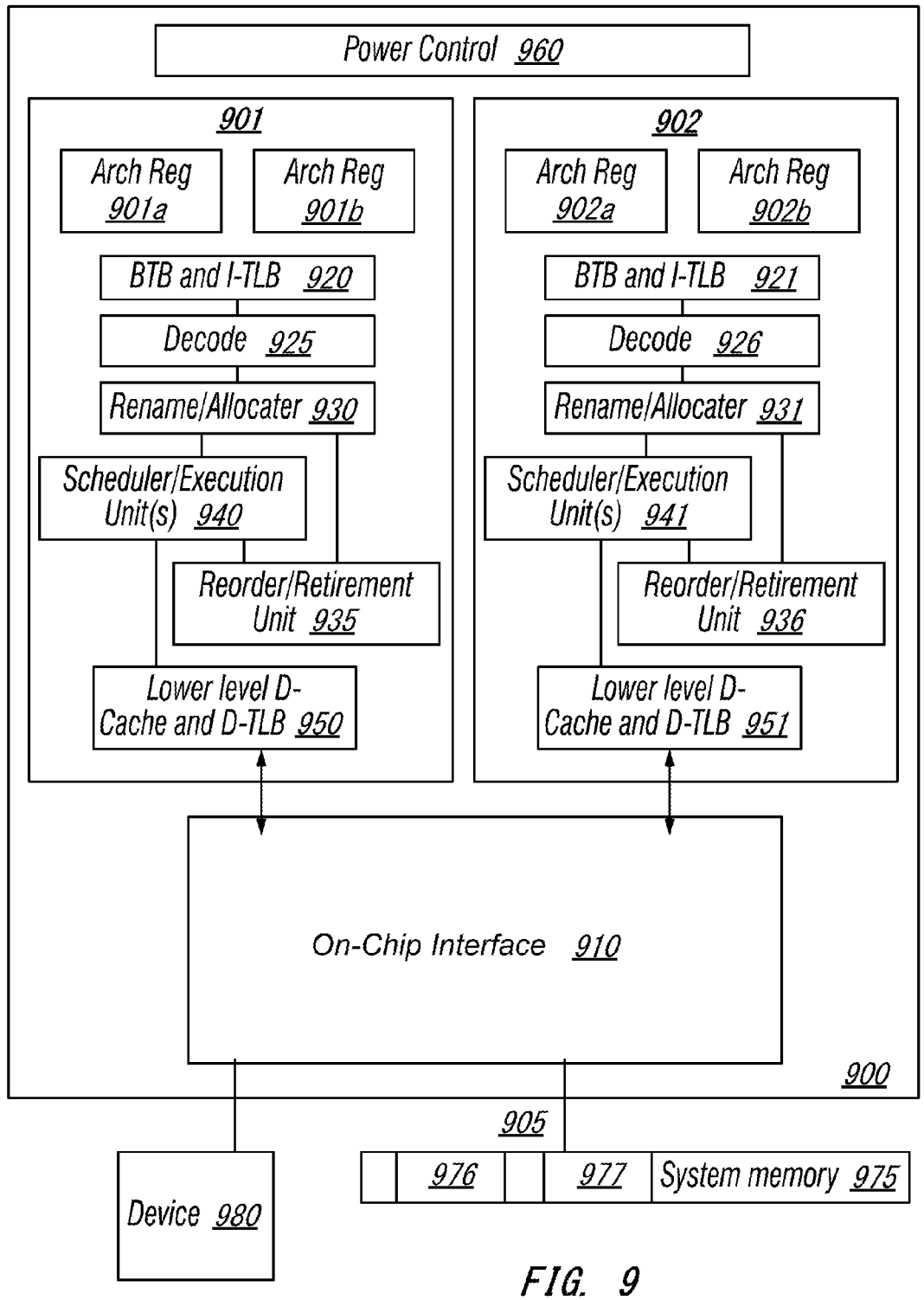
FIG. 9 illustrates an embodiment of a block diagram for a computing system including a multicore processor.

Physical processor 900, as illustrated in FIG. 9, includes two cores—core 901 and 902. Here, core 901 and 902 are considered symmetric cores, i.e. cores with the same configurations, functional units, and/or logic. In another embodiment, core 901 includes an out-of-order processor core, while core 902 includes an in-order processor core. However, cores 901 and 902 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 901 are described in further detail below, as the units in core 902 operate in a similar manner in the depicted embodiment.

As depicted, core 901 includes two hardware threads 901a and 901b, which may also be referred to as hardware thread slots 901a and 901b. Therefore, software entities, such as an operating system, in one embodiment potentially view processor 900 as four separate processors, i.e., four logical processors or processing elements capable of executing four software threads concurrently. As alluded to above, a first thread is associated with architecture state registers 901a, a second thread is associated with architecture state registers 901b, a third thread may be associated with architecture state registers 902a, and a fourth thread may be associated with architecture state registers 902b. Here, each of the architecture state registers (901a, 901b, 902a, and 902b) may be referred to as processing elements, thread slots, or thread units, as described above. As illustrated, architecture state registers 901a are replicated in architecture state registers 901b, so individual architecture states/contexts are capable of being stored for logical processor 901a and logical processor 901b. In core 901, other smaller resources, such as instruction pointers and renaming logic in allocator and renamer block 930 may also be replicated for threads 901a and 901b. Some resources, such as re-order buffers in reorder/retirement unit 935, ILTB 920, load/store buffers, and queues may be shared through partitioning. Other resources, such as general purpose internal registers, page-table base register(s), low-level data-cache and data-TLB 915, execution unit(s) 940, and portions of out-of-order unit 935 are potentially fully shared.

Processor 900 often includes other resources, which may be fully shared, shared through partitioning, or dedicated by/to processing elements. In FIG. 9, an embodiment of a purely exemplary processor with illustrative logical units/resources of a processor is illustrated. Note that a processor may include, or omit, any of these functional units, as well as include any other known functional units, logic, or firmware not depicted. As illustrated, core 901 includes a simplified, representative out-of-order (OOO) processor core. But an in-order processor may be utilized in different embodiments. The OOO core includes a branch target buffer 920 to predict branches to be executed/taken and an instruction-translation buffer (I-TLB) 920 to store address translation entries for instructions.

Core 901 further includes decode module 925 coupled to fetch unit 920 to decode fetched elements. Fetch logic, in one embodiment, includes individual sequencers associated with thread slots 901a, 901b, respectively. Usually core 901 is associated with a first ISA, which defines/specifies instructions executable on processor 900. Often machine code instructions that are part of the first ISA include a portion of the instruction (referred to as an opcode), which references/specifies an instruction or operation to be performed. Decode logic 925 includes circuitry that recognizes these instructions from their opcodes and passes the decoded instructions on in the pipeline for processing as defined by the first ISA. For example, as discussed in more detail below decoders 925, in one embodiment, include logic designed or adapted to recognize specific instructions, such as transactional instruction. As a result of the recognition by decoders 925, the architecture or core 901 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 926, in one embodiment, recognize the same ISA (or a subset thereof). Alternatively, in a heterogeneous core environment, decoders 926 recognize a second ISA (either a subset of the first ISA or a distinct ISA).

In one example, allocator and renamer block 930 includes an allocator to reserve resources, such as register files to store instruction processing results. However, threads 901a and 901b are potentially capable of out-of-order execution, where allocator and renamer block 930 also reserves other resources, such as reorder buffers to track instruction results. Unit 930 may also include a register renamer to rename program/instruction reference registers to other registers internal to processor 900. Reorder/retirement unit 935 includes components, such as the reorder buffers mentioned above, load buffers, and store buffers, to support out-of-order execution and later in-order retirement of instructions executed out-of-order.

Scheduler and execution unit(s) block 940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 950 are coupled to execution unit(s) 940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 901 and 902 share access to higher-level or further-out cache, such as a second level cache associated with on-chip interface 910. Note that higher-level or further-out refers to cache levels increasing or getting further way from the execution unit(s). In one embodiment, higher-level cache is a last-level data cache—last cache in the memory hierarchy on processor 900—such as a second or third level data cache. However, higher level cache is not so limited, as it may be associated with or include an instruction cache. A trace cache—a type of instruction cache—instead may be coupled after decoder 925 to store recently decoded traces. Here, an instruction potentially refers to a macro-instruction (i.e. a general instruction recognized by the decoders), which may decode into a number of micro-instructions (micro-operations).

In the depicted configuration, processor 900 also includes on-chip interface module 910. Historically, a memory controller, which is described in more detail below, has been included in a computing system external to processor 900. In this scenario, on-chip interface 910 is to communicate with devices external to processor 900, such as system memory 975, a chipset (often including a memory controller hub to connect to memory 975 and an I/O controller hub to connect peripheral devices), a memory controller hub, a northbridge, or other integrated circuit. And in this scenario, bus 905 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 975 may be dedicated to processor 900 or shared with other devices in a system. Common examples of types of memory 975 include DRAM, SRAM, non-volatile memory (NV memory), and other known storage devices. Note that device 980 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 900. For example in one embodiment, a memory controller hub is on the same package and/or die with processor 900. Here, a portion of the core (an on-core portion) 910 includes one or more controller(s) for interfacing with other devices such as memory 975 or a graphics device 980. The configuration including an interconnect and controllers for interfacing with such devices is often referred to as an on-core (or un-core configuration). As an example, on-chip interface 910 includes a ring interconnect for on-chip communication and a high-speed serial point-to-point link 905 for off-chip communication. Yet, in the SOC environment, even more devices, such as the network interface, co-processors, memory 975, graphics processor 980, and any other known computer devices/interface may be integrated on a single die or integrated circuit to provide small form factor with high functionality and low power consumption.

In one embodiment, processor 900 is capable of executing a compiler, optimization, and/or translator code 977 to compile, translate, and/or optimize application code 976 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 10:
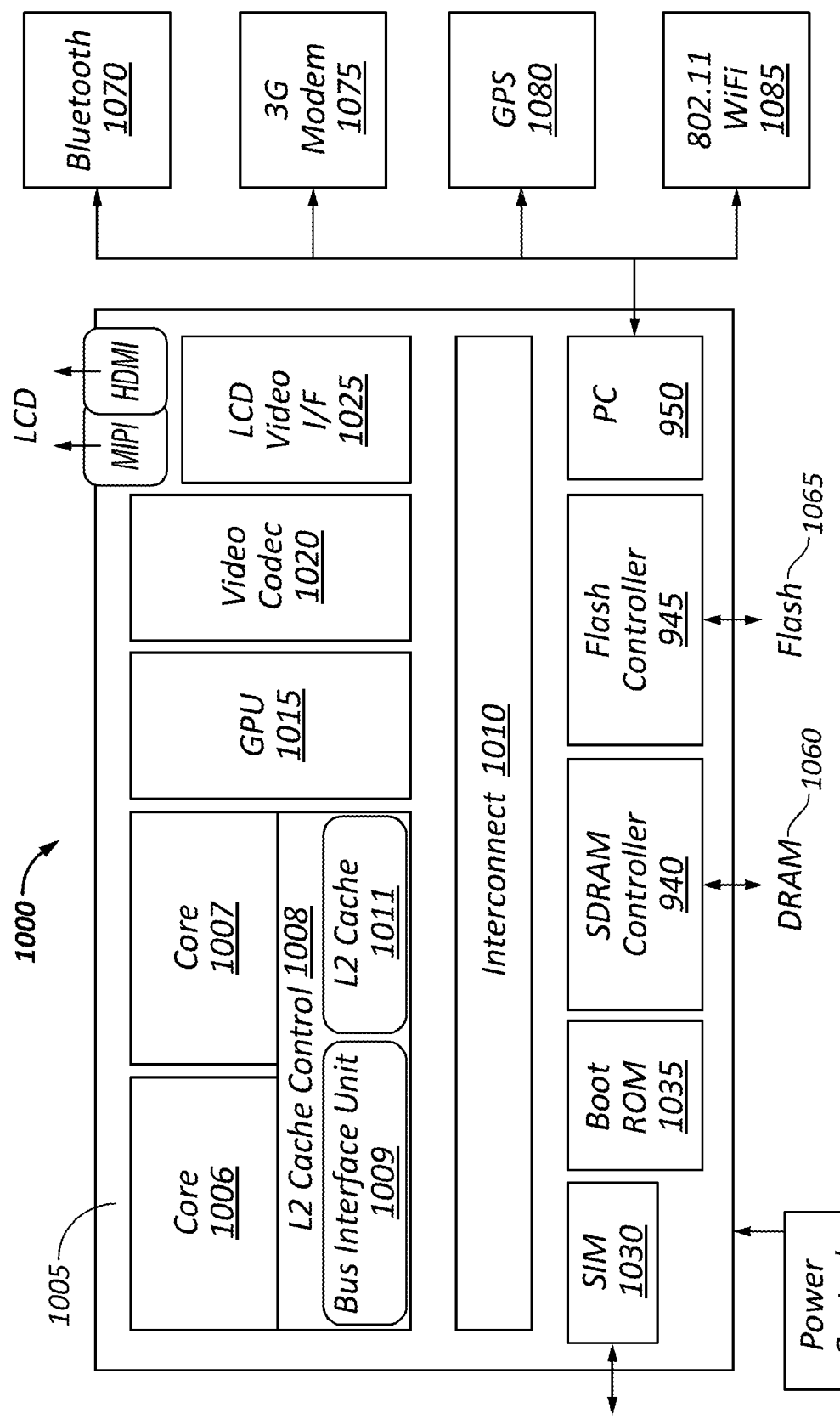
FIG. 10 illustrates another embodiment of a block diagram for a computing system.

Turning next to FIG. 10, an embodiment of a system on-chip (SOC) design in accordance with the inventions is depicted. As a specific illustrative example, SOC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Similar to the discussion above, cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1011 to communicate with other parts of system 1000. Interconnect 1010 includes an on-chip interconnect, such as an IOSF, AMBA, or other interconnect discussed above, which potentially implements one or more aspects of described herein.

Interconnect 1010 provides communication channels to the other components, such as a Subscriber Identity Module (SIM) 1030 to interface with a SIM card, a boot rom 1035 to hold boot code for execution by cores 1006 and 1007 to initialize and boot SOC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the invention described herein.

In addition, the system illustrates peripherals for communication, such as a Bluetooth module 1070, 3G modem 1075, GPS 1085, and WiFi 1085. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide a method, an apparatus, a system, a machine readable storage, a machine readable medium, hardware- and/or software-based logic, where an inbound sideband interface is provided to receive a message over a first sideband link, parity logic is provided to calculate a parity bit for the message, and an outbound sideband interface is provided to forward the message to another device over a second sideband link. The second sideband link can include a plurality of data wires and a parity bit wire. The message can be forwarded over at least some of the data wires and the parity bit can be sent to the other device over the parity bit wire to correspond with the message.

In at least one example, an inbound primary interface and an outbound primary interface are provided.

In at least one example, the message includes an error message, and the error message reports a parity error detected on one of the inbound and outbound primary interfaces.

In at least one example, the parity logic is to detect a sideband parity error based on the parity bit.

In at least one example, the apparatus includes a router, the router includes a dedicated error reporting sideband wire, and the sideband parity error is to be reported using the error reporting sideband wire.

In at least one example, the error reporting sideband wire is separate from the inbound and outbound sideband interfaces and the parity bit wire.

In at least one example, the apparatus includes an endpoint and the sideband parity error is to be reported through an error message to be sent over the outbound sideband interface.

In at least one example, the endpoint is to stop processing of the error message in response to detection of the sideband parity error.

In at least one example, the endpoint is to stop returning credits for non-posted transactions and continue returning credits for posted and completion transactions based on the sideband parity error.

In at least one example, the inbound and outbound sideband interfaces correspond to a fabric and the fabric is to enter reset based on the sideband parity error One or more embodiments may provide a method, an apparatus, a system, a machine readable storage, a machine readable medium, hardware- and/or software-based logic, where a receiver is provided to receive a message over a sideband link, the sideband link including a plurality of lanes. A parity generator determines a parity value for the message and a queue queues the message and the parity value. An error detector determines, after the queuing, that the message has a parity error based on the parity value, and a transmitter to send the parity error via a sideband wire. The sideband wire can be independent of the sideband link.

In at least one example, the sideband link includes a parity bit wire and the router is further to determine if a parity error exists in the message based on a corresponding parity bit value to be received over the parity bit wire.

In at least one example, the message is to be received from a first endpoint and the message is to be queued for forwarding to a second endpoint.

In at least one example, an inbound interface of the router connects to the first endpoint and lacks a parity bit wire, an outbound interface of the outer connects to the second endpoint and supports a parity bit wire, and the router determines the parity value on behalf of the first endpoint.

In at least one example, the message is to include an error message and the error message indicates an error detected on a primary interface of a communications fabric.

In at least one example, the error is to include a parity error detected by another device connected to the communications fabric.

In at least one example, the router is to contain the message based on the parity error.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   an inbound sideband interface to receive a message over a first sideband link;
   parity logic to calculate a parity bit for the message; and
   an outbound sideband interface to forward the message to another device over a second sideband link, wherein the second sideband link comprises a plurality of data wires and a parity bit wire, the message is to be forwarded over at least some of the data wires and the parity bit is to be sent to the other device over the parity bit wire to correspond with the message.

2. The apparatus of claim 1, further comprising an inbound primary interface and an outbound primary interface.

3. The apparatus of claim 2, wherein the message comprises an error message, and the error message reports a parity error detected on one of the inbound and outbound primary interfaces.

4. The apparatus of claim 1, wherein the parity logic is to detect a sideband parity error based on the parity bit.

5. The apparatus of claim 4, wherein the apparatus comprises a router, the router comprises a dedicated error reporting sideband wire, and the sideband parity error is to be reported using the error reporting sideband wire.

6. The apparatus of claim 5, wherein the error reporting sideband wire is separate from the inbound and outbound sideband interfaces and the parity bit wire.

7. The apparatus of claim 4, wherein the apparatus comprises an endpoint and the sideband parity error is to be reported through an error message to be sent over the outbound sideband interface.

8. The apparatus of claim 7, wherein the endpoint is to stop processing of the error message in response to detection of the sideband parity error.

9. The apparatus of claim 8, wherein the endpoint is to stop returning credits for non-posted transactions and continue returning credits for posted and completion transactions based on the sideband parity error.

10. The apparatus of claim 4, wherein the inbound and outbound sideband interfaces correspond to a fabric and the fabric is to enter reset based on the sideband parity error.

11. An apparatus comprising:
    a receiver to receive a message over a sideband link, wherein the sideband link comprises a plurality of lanes;
    a parity generator to determine a parity value for the message;
    a queue to queue the message and the parity value;
    an error detector to determine, after the queuing, that the message has a parity error based on the parity value; and
    a transmitter to send the parity error via a sideband wire, wherein the sideband wire is independent of the sideband link.

12. The apparatus of claim 11, wherein the sideband link comprises a parity bit wire and the router is further to determine if a parity error exists in the message based on a corresponding parity bit value to be received over the parity bit wire.

13. The apparatus of claim 11, wherein the message is to be received from a first endpoint and the message is to be queued for forwarding to a second endpoint.

14. The apparatus of claim 13, wherein an inbound interface of the router connects to the first endpoint and lacks a parity bit wire, an outbound interface of the outer connects to the second endpoint and supports a parity bit wire, and the router determines the parity value on behalf of the first endpoint.

15. The apparatus of claim 11, wherein the message is to comprise an error message and the error message indicates an error detected on a primary interface of a communications fabric.

16. The apparatus of claim 15, wherein the error is to comprise a parity error detected by another device connected to the communications fabric.

17. The apparatus of claim 11, wherein the router is to contain the message based on the parity error.

18. At least one machine accessible storage medium having code stored thereon, the code when executed on a machine, to cause the machine to:
    receive a message over a sideband link, wherein the sideband link is to comprise a plurality of lanes;
    determine a parity value for the message;
    queue the message, wherein the parity value is associated with the queued message;

determine, after the queuing, that the message has a parity error based on the parity value; and report the parity error via a sideband wire, wherein the sideband wire is independent of the sideband link.

19. A system comprising:
a communication fabric comprising a plurality of primary messaging links, a plurality of sideband messaging links, and at least one router;
a first device comprising a first primary interface to connect to at least one of the plurality of primary messaging links and a first sideband interface to connect to at least one of the plurality of sideband messaging links; and
a second device comprising:
  a second primary interface to connect to at least one of the plurality of primary messaging links;
  a second sideband interface to connect to at least one of the plurality of sideband messaging links; and
  a parity handler to determine whether parity errors exist in sideband messages to be received over the second sideband interface; and
wherein the router is to route sideband messages between the first and second devices over one or more of the plurality of sideband messaging links, and the router comprises parity logic to determine whether parity errors exist on messages received or sent by the router.

20. The system of claim 19, wherein the first device does not support parity handling of sideband messages to be communicated using the sideband messaging links and the router is to provide parity handling for sideband messages received from the first device.

21. A non-transitory machine readable medium including information to represent hardware structures, when manufactured, to be configured to:
receive a message over a first sideband link;
calculate a parity bit for the message; and
forward the message to another device over a second sideband link, wherein the second sideband link comprises a plurality of data wires and a parity bit wire, the message is to be forwarded over at least some of the data wires and the parity bit is to be sent to the other device over the parity bit wire to correspond with the message.

* * * * *